United States Patent [19]

Umemoto et al.

[11] Patent Number: 4,689,278
[45] Date of Patent: Aug. 25, 1987

[54] PHOSPHOR AND RADIATION IMAGE STORAGE PANEL EMPLOYING THE SAME

[75] Inventors: Chiyuki Umemoto; Satoshi Arakawa, both of Kaisei, Japan

[73] Assignee: Fuji Photo Film Co., Ltd., Japan

[21] Appl. No.: 753,375

[22] Filed: Jul. 10, 1985

[30] Foreign Application Priority Data

Jul. 10, 1984 [JP] Japan .................... 59-141491

[51] Int. Cl.$^4$ .................... C09K 11/00; C09K 11/465
[52] U.S. Cl. .................... 428/690; 428/691;
428/917; 250/483.1; 250/484.1; 252/301.4 H
[58] Field of Search .................. 428/690, 691, 917;
250/483.1, 484.1; 252/301.4 H

[56] References Cited

U.S. PATENT DOCUMENTS

| | | | |
|---|---|---|---|
| 4,049,992 | 9/1977 | Verstegen et al. | 428/690 X |
| 4,505,989 | 3/1985 | Umemoto et al. | 428/691 |
| 4,508,636 | 4/1985 | Ochiai | 428/690 X |
| 4,524,300 | 6/1985 | Rutten et al. | 428/690 X |
| 4,544,605 | 10/1985 | Miyayaki et al. | 428/690 X |

Primary Examiner—Nancy A. Swisher
Attorney, Agent, or Firm—Gerald J. Ferguson, Jr.; Michael P. Hoffman; Ronni S. Malamud

[57] ABSTRACT

A divalent europium activated barium fluorohalide phosphor having the formula (I):

$$(Ba_{1-a}, M^{II}{}_a)FX \cdot bNaX' \cdot c\{Si\} \cdot d\{Al\} : xEu^{2+} \qquad (I)$$

in which $M^{II}$ is at least one alkaline earth metal selected from the group consisting of Ca and Sr; each of X and X' is at least one halogen selected from the group consisting of Cl, Br and I; {Si} and {Al} are respectively Si component and Al Component; a, b and x are numbers satisfying the conditions of $0 \leq a \leq 5 \times 10^{-2}$, $0 < b \leq 2.0$ and $0 < x \leq 0.2$, respectively; and c and d are numbers satisfying the conditions of $10^{-5} \leq c + d \leq 0.5$ and $0 < c/(c+d) < 1.0$. A radiation image storage panel employing said phosphor is also disclosed.

20 Claims, 2 Drawing Figures

PHOSPHOR AND RADIATION IMAGE STORAGE PANEL EMPLOYING THE SAME

BACKGROUND OF THE INVENTION

1. Field of the Invention

This invention relates to a phosphor and a radiation image storage panel employing the same, and more particularly, to a divalent europium activated barium fluorohalide phosphor and a radiation image storage panel employing the same.

2. Description of the Prior Art

Recently, it has been found that a divalent europium activated barium fluorohalide phosphor (BaFX:Eu$^{2+}$, in which X is at least one halogen selected from the group consisting of Cl, Br and I) absorbs and stores a portion of radiation energy when exposed to a radiation such as X-rays, and emits light in the near ultraviolet to blue region when excited with an electromagnetic wave within a wavelength region of 450–900 nm after exposure to the radiation, that is, the phosphor shows stimulated emission (the peak wavelength of the stimulated emission is within the region of approx. 385–405 nm, depending upon the kind of halogen which is a component of the phosphor). In particular, the divalent europium activated barium fluorohalide phosphor has been paid much attention and investigated as a stimulable phosphor employable for a radiation image storage panel (i.e., stimulable phosphor sheet) which is used in a radiation image recording and reproducing method utilizing the stimulability thereof.

A radiation image storage panel has a basic structure comprising a support and at least one phosphor layer provided on one surface of the support, which comprises a binder and a stimulable phosphor dispersed therein. Further, a transparent protective film is generally provided on the free surface (surface not facing the support) of the phosphor layer to keep the phosphor layer from chemical deterioration or physical shock.

The radiation image recording and reproducing method using the above-described radiation image storage panel comprising the stimulable phosphor is a very advantageous method replacing the conventional radiography. As described, for example, in U.S. Pat. No. 4,239,968, the method involves steps of causing the stimulable phosphor of the panel to absorb radiation energy having passed through an object or having radiated from an object; exciting the stimulable phosphor with an electromagnetic wave such as visible light and infrared rays (hereinafter referred to as "stimulating rays") to sequentially release the radiation energy stored in the stimulable phosphor as light emission (stimulated emission); photoelectrically detecting (reading out) the emitted light to obtain electric signals; and reproducing a visible image from the electric signals on a recording material such as a photosensitive film or on a display device such as CRT.

In the radiation image recording and reproducing method, a radiation image can be obtained with a sufficient amount of information by applying a radiation to the object at considerably smaller dose, as compared with the case of using the conventional radiography. Accordingly, this method is of great value especially when the method is used for medical diagnosis.

The operation of reading out the radiation energy stored in the radiation image storage panel in the abovedescribed method is generally carried out by the steps of scanning the panel with a laser beam (stimulating rays) to sequentially excite the stimulable phosphor so as to release the radiation energy stored therein as light emission and detecting the emitted light by a photosensor such as a photomultiplier.

In the last step of the read-out operation, the light which is continuously emitted by the stimulable phosphor of the radiation image storage panel after terminating the excitation with stimulating rays (namely, afterglow of stimulated emission) causes the decrease of S/N ratio of the resulting image. More in detail, the afterglow given by the phosphor particles other than the phosphor particles aimed to excite is detected as the light emitted by the aimed ones in the case that the phosphor gives afterglow in a relatively high ratio to the amount of the stimulated emission. As a result, the image provided by the panel comprising such a stimulable phosphor tends to be deteriorated on the image quality (sharpness, density resolution, etc.).

The afterglow characteristics of the panel varies depending not only on the employed stimulable phosphor but also on the intensity of stimulating rays, the scanning speed, etc., in the case of using a laser beam as the stimulating rays. In practical use, the influence of afterglow on the image quality further varies depending upon the detecting procedure of stimulated emission. However, it is of great value to improve the afterglow characteristics of the panel which give an adverse effect to the image quality, even if the improvement is not so high.

The radiation image recording and reproducing method using the radiation image storage panel comprising the stimulable phosphor is very advantageous as described above, and the method is desired to show the sensitivity thereof as high as possible. The sensitivity of the radiation image storage panel to a radiation generally increases as the luminance of stimulated emission of the phosphor employed in the panel increases. Accordingly, it is desired that the luminance of stimulated emission of the phosphor employed in the panel is as high as possible.

The above-mentioned divalent europium activated barium fluorohalide phosphor is improved in the luminance of stimulated emission by incorporating a specific amount of sodium halide thereinto as described in Japanese Patent Provisional Publication No. 59(1984)-56479. The phosphor containing sodium halide gives stimulated emission of high luminance, but tends to show the increased afterglow of stimulated emission.

Further incorporation of a specific amount of calcium and/or strontium into the phosphor brings about the improvement of afterglow characteristics as described in Japanese Patent Applications No. 58(1983)-24731, No. 59(1984)-11762 and No. 59(1984)-11763 (whole content of which is described in U.S. Patent Application Ser. No. 687,574 or European patent application No. 84116448.6). That is, a divalent europium activated barium fluorohalide phosphor containing calcium and strontium in addition to sodium halide, which has the following formula:

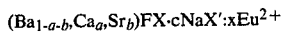

$$(Ba_{1-a-b},Ca_a,Sr_b)FX \cdot cNaX':xEu^{2+}$$

in which each of X and X' is at least one halogen selected from the group consisting of Cl, Br and I; a and b are numbers satisfying the conditions of $0 \leq a \leq 10^{-1}$ and $0 \leq b \leq 10^{-1}$ and $a+b \neq 0$, provided that $a+b$ is not higher than $5 \times 10^{-2}$ in the case of $ab \neq 0$; and c and x are numbers satisfying the conditions of $0<c\leq 2.0$ and $0<x\leq 0.2$, respectively, gives stimulated emission of high luminance and is improved in the afterglow characteristics.

SUMMARY OF THE INVENTION

It is an object of the present invention to provide a divalent europium activated barium fluorohalide phosphor which is improved in the afterglow characteristics of stimulated emission.

It is another object of the present invention to provide a radiation image storage panel which is improved in the quality of the image provided thereby.

The present inventors have studied on the divalent europium activated barium fluorohalide phosphor containing sodium halide and the phosphor containing calcium and/or strontium in addition to sodium halide. As a result, they have found that the afterglow characteristics of stimulated emission of the phosphor can be remarkably improved by incorporating Si component and Al component in a specific amount ratio thereinto.

The phosphor of the present invention is a divalent europium activated barium fluorohalide phosphor having the formula (I):

$$(Ba_{1-a}, M^{II}_a)FX \cdot bNaX' \cdot c\{Si\} \cdot d\{Al\}:xEu^{2+} \qquad (I)$$

in which $M^{II}$ is at least one alkaline earth metal selected from the group consisting of Ca and Sr; each of X and X' is at least one halogen selected from the group consisting of Cl, Br and I; {Si} and {Al} are respectively Si component and Al component; a, b and x are numbers satisfying the conditions of $0\leq a\leq 5\times 10^{-2}$, $0<b\leq 2.0$ and $0<x\leq 0.2$, respectively; and c and d are numbers satisfying the conditions of $10^{-5}\leq c+d\leq 0.5$ and $0<c/(c+d)<1.0$.

In the phosphor having the formula (I), Si component and Al component may consist of single substances of Si and Al, respectively, or may consist of their compounds.

The radiation image storage panel of the present invention comprises a support and a stimulable phosphor layer provided thereon, in which the stimulable phosphor layer contains the divalent europium activated barium fluorohalide phosphor having the formula (I).

The invention is accomplished on the finding that the divalent europium activated barium fluorohalide phosphor having the formula (I) has the prominently improved afterglow characteristics particularly in a period of approx. $10^{-3}$–$10^{-2}$ sec. after excitation with stimulating rays. More in detail, the phosphor obtained by incorporating both of Si component and Al component in a specific ratio into the aforementioned divalent europium activated barium fluorohalide phosphor containing sodium halide or the phosphor containing sodium halide and further calcium and/or strontium is remarkably improved in the afterglow characteristics, as compared with that containing only one of Si component and Al component.

Accordingly, the radiation image storage panel of the invention employing the divalent europium activated barium fluorohalide phosphor having the formula (I) can stably provide an image of high quality.

DETAILED DESCRIPTION OF THE INVENTION

Figure 1:
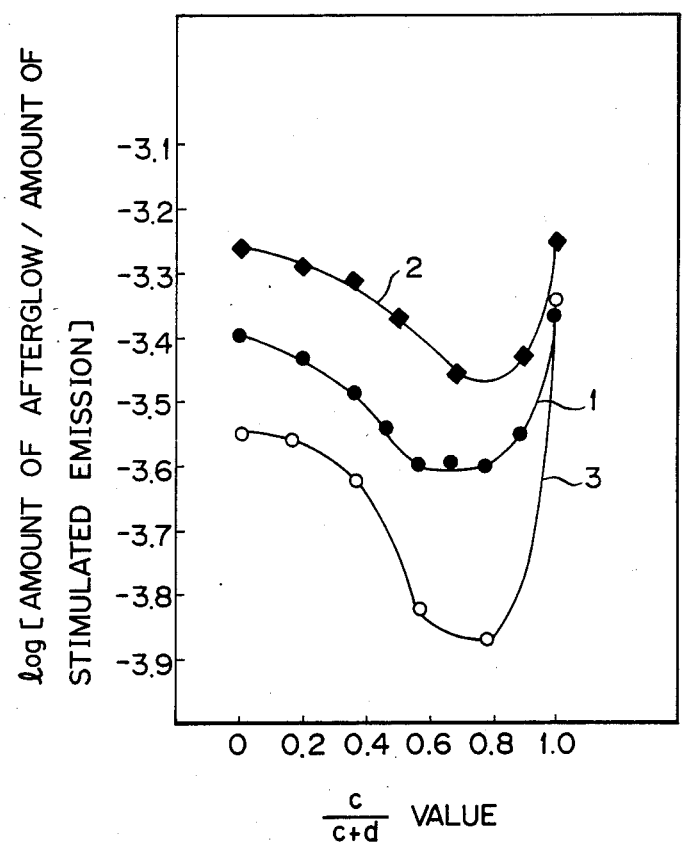
FIG. 1 graphically shows relationships between an amount ratio of {Si} and {Al}[c/(c+d) value] and an amount of afterglow with respect to a radiation image storage panel containing $(Ba_{0.995},Ca_{0.005})FBr \cdot 0.0023NaBr \cdot c\{Si\} \cdot d\{Al\}:0.001Eu^{2+}$ phosphor which was prepared by using $SiO_2$ and $Al_2O_3$ for starting materials of {Si} and {Al}, wherein Curves 1 to 3 correspond to $c+d=0.006$, 0.0017 and 0.033, respectively.

The divalent europium activated barium fluorohalide phosphor of the present invention having the above-mentioned formula (I) can be prepared, for instance, by a process described below.

As starting materials, the following materials can be employed:

(1) barium fluoride;

(2) barium halide (except barium fluoride);

(3) at least one alkaline earth metal halide selected from the group consisting of calcium halide and strontium halide [otherwise, it is not employed when a=0 in the formula (I)];

(4) sodium halide (except sodium fluoride);

(5) at least one compound selected from the group consisting of silicon compounds such as silicon oxide and silicon halide;

(6) at least one compound selected from the group consisting of aluminium compounds such as aluminium oxide and aluminium halide; and (7) at least one compound selected from the group consisting of europium compounds such as europium halide, europium oxide, europium nitrate and europium sulfate. Further, ammonium halide may be employed as a flux.

In the first place, the above-mentioned barium fluoride (1), barium halide (2), alkaline earth metal halide (3), sodium halide (4), silicon compound (5), aluminium compound (6) and europium compound (7) are mixed in the stoichiometric ratio corresponding to the formula (II):

$$(Ba_{1-a}, M^{II}_a)FX \cdot bNaX' \cdot c\{Si\} \cdot d\{Al\}:xEu \qquad (II)$$

in which $M^{II}$, X, X', a, b, c, d and x have the same meanings as defined above.

The mixing procedure is conducted, for instance, by mixing the starting materials in the form of a suspension. From the suspension of the starting material mixture, the solvent (e.g., water) is removed to obtain a dry mixture in a solid form. The removal of solvent is preferably conducted at room temperature or not so high temperature (for instance, not higher than 200° C.) by drying under reduced pressure and/or vacuum. The mixing procedure is by no means restricted to this one.

As a modification, there may be employed a procedure of mixing the starting materials (1), (2) and (7) in the form of a suspension, drying the suspension, and then adding the alkaline earth metal halide (3), sodium halide (4), silicon compound (5) and aluminium compound (6) to the dry mixture. Otherwise, the silicon compound (5) and aluminium compound (6) may be added to the first fired product when the firing of the dry mixture is conducted twice.

In the second place, the obtained dry mixture is finely pulverized, and the pulverized mixture is then placed in a heat-resistant container such as a quartz boat or an alumina crucible and fired in an electric furnace. The firing procedure (first firing) is conducted at a temperature of 500°–1300° C. for 0.5–6 hours under a weak reducing atmosphere such as a nitrogen gas atmosphere containing a small amount of hydrogen gas or a carbon dioxide gas atmosphere containing carbon monoxide gas. When the employed europium compound contains trivalent europium, the trivalent europium is reduced to divalent europium under the weak reducing atmosphere in the firing stage.

The fired product is taken out of the electric furnace, allowed to stand for cooling and pulverized. The pulverized product may be further fired (second firing). The second firing is conducted at a temperature of 500°–800° C. for 0.5–12 hours in an inert atmosphere such as a nitrogen gas atmosphere or an argon gas atmosphere, or in the above-mentioned weak reducing atmosphere.

After the firing is complete, a powdery phosphor is obtained. The phosphor may be further processed in a conventional manner involving a variety of procedures for the preparation of phosphors such as a washing procedure, a drying procedure and a sieving procedure, if desired.

The above-described process gives the divalent europium activated barium fluorohalide phosphor having the formula (I):

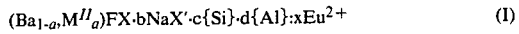

$$(Ba_{1-a},M^{II}{}_a)FX \cdot bNaX' \cdot c\{Si\} \cdot d\{Al\} : xEu^{2+} \qquad (I)$$

in which $M^{II}$ is at least one alkaline earth metal selected from the group consisting of Ca and Sr; each of X and X' is at least one halogen selected from the group consisting of Cl, Br and I; $\{Si\}$ and $\{Al\}$ are respectively Si component and Al component; a, b and x are numbers satisfying the conditions of $0 \leq a \leq 5 \times 10^{-2}$, $0 < b \leq 2.0$ and $0 < x \leq 0.2$, respectively; and c and d are numbers satisfying the conditions of $10^{-5} \leq c+d \leq 0.5$ and $0 < c/(c+d) < 1.0$.

It is not evident for the state in which the silicon compound and aluminium compound employed as the starting materials for the phosphor are contained in the resulting phosphor, but all the silicon and aluminium to be employed are confirmed to remain therein.

The phosphor of the invention having the formula (I) gives stimulated emission when excited with an electromagnetic wave having a wavelength within the region of 450–900 nm after exposure to a radiation such as X-rays. From the viewpoint of the afterglow characteristics of the stimulated emission, the total of c value and d value in the formula (I) which respectively indicate the amount of silicon component $\{Si\}$ and the amount of aluminium component $\{Al\}$ is preferably within the range of $5 \times 10^{-5} \leq c+d \leq 0.3$, and more preferably of $10^{-4} \leq c+d \leq 0.2$. As the starting material of $\{Si\}$, $SiO_2$ is preferably employed, and $Al_2O_3$ and/or $AlF_3$ is preferably employed as that of $\{Al\}$. The ratio of c value and d value is preferably within the range of $0.3 \leq c/(c+d) < 1.0$ in the case of employing $SiO_2$ and $Al_2O_3$ as the starting materials of $\{Si\}$ and $\{Al\}$, or preferably of $0.1 \leq c/(c+d) \leq 0.8$ in the case of employing $SiO_2$ and $AlF_3$ as the starting materials thereof.

From the same viewpoint, the phosphor of the invention preferably contains alkaline earth metal $M^{II}$ in the formula (I), that is, a value indicating the amount of $M^{II}$ is preferably within the range of $0 < a \leq 5 \times 10^{-2}$ and more preferably of $5 \times 10^{-4} \leq a \leq 2 \times 10^{-2}$. The alkaline earth metal $M^{II}$ may be singly calcium or strontium, or a combination thereof. From the viewpoint of the luminance of stimulated emission, sodium halide NaX' is preferably NaBr and b value indicating its amount is preferably within the range of $10^{-5} \leq b \leq 5 \times 10^{-1}$, and more preferably of $5 \times 10^{-4} \leq b \leq 10^{-2}$. From the both viewpoint, x value which indicates the amount of europium activator is preferably within the range of $10^{-5} \leq x \leq 10^{-1}$.

Halogen X in the formula (I) is preferably at least one element selected from the group consisting of Br and I from the viewpoint of the luminance of stimulated emission. The stimulation spectrum of the phosphor of the invention is in the wavelength region of 450–900 nm as described above, and its peak shifts toward the longer wavelength side depending upon the kind of halogen X in the order of Cl, Br and I. Accordingly, also from the viewpoint of matching with a source of stimulating rays such as a He-Ne laser (633 nm) and a semiconductor laser (infrared rays) which are now proposed for employment in practical use, X is preferably Br, I, or a combination of Br and I.

A radiation image storage panel having a phosphor layer which comprises $(Ba_{0.995},Ca_{0.005})FBr \cdot 0.0023 \cdot NaBr \cdot c\{Si\} \cdot d\{Al\} : 0.001Eu^{2+}$ phosphor (an example of the phosphor of the present invention) dispersed in a binder has relationships between amount ratio of the silicon component and the aluminium component $[c/(c+d)$ value] and an amount of afterglow as shown in FIG. 1. For each of the components $\{Si\}$ and $\{Al\}$, their oxides were employed in the process preparation of the phosphor, and the total amount $(c+d)$ is constant (Curve 1: $c+d=0.006$, Curve 2: $c+d=0.0017$, and Curve 3: $c+d=0.033$).

In FIG. 1, the amount of afterglow on the ordinate indicates a relative amount of afterglow measured at $2 \times 10^{-3}$ sec. after scanning with stimulating rays (logarithmic value of [amount of afterglow/amount of stimulated emission]).

As is evident from FIG. 1, the amount of afterglow is reduced for the radiation image storage panel comprising $(Ba_{0.995},Ca_{0.005})FBr \cdot 0.0023NaBr \cdot c\{Si\} \cdot d\{Al\} : 0.001Eu^{2+}$ phosphor in which both the silicon component and aluminium component are contained $[0 < c/(c+d) < 1.0]$, as compared with each of the panels which comprises the phosphor containing the aluminium component only $[c/(c+d) = 0]$ and the phosphor containing silicon component only $[c/(c+d) = 1.0]$. That is, the panel is improved in the afterglow characteristics. Particularly in the range of $0.3 \leq c/(c+d) < 1.0$, the panel is remarkably improved in the afterglow characteristics.

It has been confirmed that the same tendency as shown in FIG. 1 is appeared when varying the starting materials of the silicon component and the aluminum component or the total amount thereof. Also has been confirmed that radiation image storage panels employing divalent europium activated barium fluorohalide phosphor having the formula (I) other than the above-mentioned one have the same tendencies on the afterglow characteristics.

The divalent europium activated barium fluorohalide phosphor of the present invention basically has the above-mentioned formula (I), and other various components may be further incorporated into the phosphor in the preparation thereof, so far as they do not reduce the effect based on the incorporation of {Si} and {Al} (i.e., the improvement of the afterglow characteristics). Phosphors containing such additive components are included in the phosphor of the invention. Examples of the additive component include the following substances:

metal oxides as described in Japanese Patent Provisional Publication No. 55(1980)-160078;

tetrafluoroboric acid compounds as described in U.S. patent application Ser. No. 520,215;

hexafluoro compounds as described in U.S. patent application Ser. No. 502,648;

alkali metal halides ($M^I X''$, in which $M^I$ is at least one alkali metal selected group consisting of Li, K, Rb and Cs; and $X''$ is at least one halogen selected from the group consisting of F, Cl, Br and I), divalent metal halides ($M^{II} X'''_2$, in which $M^{II}$ is at least one divalent metal selected from the group consisting of Be and Mg: and $X'''$ is at least one halogen selected from the group consisting of F, Cl, Br and I), and trivalent metal halides ($M^{III} X''''_3$, in which $M^{III}$ is at least one trivalent metal selected from the group consisting of Ga, In and Tl; and $X''''$ is at least one halogen selected from the group consisting of F, Cl, Br and I), as described in U.S. patent application Ser. No. 543,326;

zirconium and scandium as described in Japanese Patent Provisional Publication No. 56(1981)-116777;

boron as described in Japanese Patent Provisional Publication No. 57(1982)-23673;

arsenic as described in Japanese Patent Provisional Publication No. 57(1982)-23675; and transition metals as described in U.S. patent application Ser. No. 535,928.

In the case that the phosphor of the invention contains such additive components as described above, the additive components are incorporated into the suspension in the mixing procedure of the starting materials for the phosphor or into the dry mixture prior to the firing stage.

The radiation image storage panel of the present invention will be described hereinafter.

The radiation image storage panel basically comprises a support and a phosphor layer provided thereon, which comprises a binder and a stimulable phosphor dispersed therein. The phosphor layer can be formed on the support, for instance, by the following procedure.

In the first place, the stimulable phosphor particles having the formula (I) and a binder are added to an appropriate solvent, and then they are mixed to prepare a coating dispersion which comprises the phosphor particles homogeneously dispersed in the binder solution.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinyidene chloride-vinylchloride copolymer, polymethyl methacrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethylether; and mixtures of the above-mentioned compounds.

The mixing ratio of the binder to the stimulable phosphor in the coating dispersion can be determined according to the characteristics of the aimed radiation image storage panel and the nature of the phosphor employed. Generally, the ratio is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of a support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of the phosphor layer. The thickness of the phosphor layer varies depending upon the characteristics of the aimed radiation image storage panel, the nature of the phosphor, the ratio of the binder to the phosphor, etc. In general, the thickness of the phosphor layer is within a range of from 20 $\mu$m to 1 mm, and preferably within a range of from 50 to 500 $\mu$m.

The phosphor layer can be provided onto the support by the methods other than that given in the above. For instance, the phosphor layer is initially prepared on a sheet material such as a glass plate, a metal plate or a plastic sheet using the aforementioned coating dispersion and then thus prepared phosphor layer is superposed on the genuine support by pressing or using an adhesive agent.

The phosphor layer may consist of either a single layer or plural (two or more) layers. In the case of two or more phosphor layers, at least one layer contains the aforementioned divalent europium activated barium fluorohalide phosphor. In any cases of a single and plural layers, a variety of known stimulable phosphors can be employed in combination with the above phosphor.

The support material employed in the present invention can be selected from those employable for the radiogaphic intensifying screens in the conventional radiography or those employable for the known radiation image storage panel. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of a conventional radiation image storage panel, one or more additional layers are occasionally provided between the support and the phosphor layer so as to enhance the bonding strength between the support and the phosphor layer, or to improve the sensitivity of the panel or the quality of an image provided thereby sharpness and graininess). For instance, a subbing layer or an adhesive layer may be provided by coating polymer material such as gelatin over the surface of the support on the phosphor layerside. Otherwise, a light-reflecting layer or a light-absorbing layer may be provided by forming a polymer material layer containing a light-reflecting material such as titanium dioxide or a light-absorbing material such as carbon black. In the present invention, one or more of these additional layers may be provided on the support.

As described in U.S. patent application Ser. No. 496,278, the phosphor layer-side surface of the support (or the surface of an adhesive layer, light-reflecting layer, or light-absorbing layer in the case where such layers provided on the phosphor layer) may be provided with protruded and depressed portions for the enhancement of the sharpness of resulting image.

The radiation image storage panel generally has a transparent protective film on a free surface of a phosphor layer (not facing a support) to protect the phosphor layer from physical and chemical deterioration. In the radiation image storage panel of the present invention, it is preferable to provide a transparent protective film for the same purpose.

The protective film can be provided onto the phosphor layer by coating the surface of the phosphor layer with a solution of a transparent polymer such as a cellulose derivative (e.g., cellulose acetate or nitrocellulose), or a synthetic polymer (e.g., polymethyl methacrylate, polyvinyl butyral, polyvinyl formal, polycarbonate, polyvinyl acetate, or vinyl chloride-vinyl acetate copolymer), and drying the coated solution. Alternatively, the protective film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approx. 3 to 20 $\mu$m.

For the enhancement of sharpness of the resulting image, at least a portion of the radiation image storage panel may be colored with a colorant, as described in U.S. Pat. No. 4,394,581 and U.S. patent application Ser. No. 326,642. For the same purpose, the phosphor layer of the radiation image storage panel according to the present invention may contain a white powder, as described in U.S. Pat. No. 4,350,893.

The present invention will be illustrated by the following examples and comparison examples, but these examples by no means restrict the invention.

EXAMPLE 1

To 500 cc of distilled water ($H_2O$) were added 175.34 g. of barium fluoride ($BaF_2$), 333.18 g of barium bromide ($BaBr_2 \cdot 2H_2O$) and 0.783 g. of europium bromide ($EuBr_3$), and they were mixed to give a suspension. The suspension was dried at 60° C. under reduced pressure for 3 hours and further dried at 150° C. under vacuum for another 3 hours. The dry product was finely pulverized in a mortar. To 100 g. of thus pulverized product were added 0.085 g. of calcium fluoride ($CaF_2$), 0.215 g. of calcium bromide ($CaBr_2$), 0.1 g. of sodium bromide (NaBr), 0.10 g. of silicon dioxide ($SiO_2$) and 0.04 g. of aluminium oxide ($Al_2O_3$), and they were mixed to prepare a mixture of starting materials for a phosphor.

Then, the mixture of the starting materials was placed in an alumina crucible, which was, in turn, placed in a high-temperature electric furnace for firing. The firing was done at 900° C. for 1.5 hours in a carbon dioxide gas atmosphere containing a small amount of carbon monoxide gas. After the firing was complete, the crucible was taken out of the furnace and allowed to stand for cooling. The fired product was pulverized to obtain a powdery divalent europium activated barium fluorobromide phosphor [$(Ba_{0.995},Ca_{0.005})FBr \cdot 0.002$- $3NaBr \cdot 0.004\{Si\} \cdot 0.002\{Al\} : 0.001Eu^{2+}$].

Subsequently, using the obtained phosphor, a radiation image storage panel was prepared in the following manner.

To a mixture of the phosphor particles and a linear polyester resin were successively added methyl ethyl ketone and nitrocellulose (nitrification degree: 11.5%), to prepare a dispersion containing the phosphor particles. Then, tricresyl phosphate, n-butanol and methyl ethyl ketone were added to the dispersion, and the mixture was sufficiently stirred by means of a propeller agitater to obtain a homogeneous coating dispersion containing the binder and the phosphor particles in the ratio of 1:20 (binder:phosphor, by weight) and having a viscosity of 25-35 PS (at 25° C.).

The coating dispersion was applied onto a polyethylene terephthalate sheet containing carbon black (support, thickness: 250 $\mu$m), placed horizontally on a glass plate. The application of the coating dispersion was carried out using a doctor blade. After the coating was complete, the support having the coating dispersion was placed in an oven and heated at a temperature gradually rising from 25° to 100° C. Thus, a phosphor layer having the thickness of approximately 200 $\mu$m was formed on the support.

On the phosphor layer was placed a transparent polyethylene terephthalate film (thickness: 12 $\mu$m; provided with a polyester adhesive layer) to combine the film and the phosphor layer with the adhesive layer. Thus, a radiation image storage panel consisting essentially of a support, a phosphor layer and a transparent protective film was prepared.

COMPARISON EXAMPLE 1

The procedure of Example 1 was repeated except for adding 0.085 g. of calcium fluoride, 0.215 g. of calcium bromide, 0.1 g. of sodium bromide and 0.12 g. of aluminium oxide to 100 g. of the pulverized product, to obtain a powdery divalent europium activated barium fluorobromide phosphor [$(Ba_{0.995},Ca_{0.005})FBr \cdot 0.0023NaBr \cdot 0.006\{Al\}:0.001Eu^{2+}$].

Using the obtained phosphor, a radiation image storage panel consisting essentially of a support, a phosphor layer and a transparent protective film was prepared in the same manner as described in Example 1.

COMPARISON EXAMPLE 2

The procedure of Example 1 was repeated except for adding 0.085 g. of calcium fluoride, 0.215 g. of calcium bromide, 0.1 g. of sodium bromide and 0.15 g. of silicon dioxide to 100 g. of the pulverized product, to obtain a powdery divalent europium activated barium fluorobromide phosphor [$(Ba_{0.995},Ca_{0.005})FBr \cdot 0.0023NaBr \cdot 0.006\{Si\}:0.001Eu^{2+}$].

Using the obtained phosphor, a radiation image storage panel consisting essentially of a support, a phosphor layer and a transparent protective film was prepared in the same manner as described in Example 1.

The radiation image storage panels prepared in Example 1 and Comparison Examples 1 and 2 were evaluated on the afterglow characteristics according to the following test:

The radiation image storage panel was cut to give a test strip having a width of 7 cm. The test strip was exposed to X-rays at 80 KVp and subsequently once scanned with a He-Ne laser beam (wavelength: 632.8 nm) in the direction of its width in the scanning period of $5 \times 10^{-3}$ sec., to measure the decay of afterglow of the stimulated emission. The evaluation was done by a relative amount of afterglow, namely the logarithmic value of [amount of afterglow/amount of stimulated emission], wherein the amount of afterglow is a value measured at $2 \times 10^{-3}$ sec. after scanning with the laser beam.

The results of the evaluation are set forth in Table 1. The ratio between the amount of {Si} (c value) and the amount of {Al} (d value) is also set forth in Table 1.

TABLE 1

| | c/(c + d) | Relative Amount of Afterglow |
|---|---|---|
| Example 2 | 0.67 | −3.60 |
| Com. Example 1 | 0.0 | −3.40 |
| Com. Example 2 | 1.0 | −3.37 |

EXAMPLE 2

(1) The procedure of Example 1 was repeated except for varying the amounts of silicon dioxide and aluminium oxide to obtain a variety of divalent europium activated barium fluorobromide phosphors in which the total amount of {Si} and {Al} is constant and their amount ratio is in the range of 0−1.0[$(Ba_{0.995},Ca_{0.005})FBr \cdot 0.0023NaBr \cdot c\{Si\} \cdot d\{Al\}:0.001Eu^{2+}$, $c+d=0.006$].

(2) The procedure of the above-mentioned (1) was repeated except for the total amount of {Si} and {Al} being 0.0017 to obtain a variety of divalent europium activated barium fluorobromide phosphors in which their amount ratio is in the range of 0−1.0[$(Ba_{0.995},Ca_{0.005})FBr \cdot 0.0023NaBr \cdot c\{Si\} \cdot d\{Al\}:0.001Eu^{2+}$, $c+d=0.0017$].

(3) The procedure of the above-mentioned (1) was repeated except for the total amount of {Si} and {Al} being 0.033 to obtain a variety of divalent europium activated barium fluorobromide phosphors in which their amount ratio is in the range of 0−1.0[$(Ba_{0.995},Ca_{0.005})FBr \cdot 0.0023NaBr \cdot c\{Si\} \cdot d\{Al\}:0.001Eu^{2+}$, $c+d=0.033$].

Using thus obtained phosphors, a variety of radiation image storage panels consisting essentially of a support, a phosphor layer and a transparent protective film were prepared in the same manner as described in Example 1.

The radiation image storage panels prepared in Example 2 were evaluated on the afterglow characteristics by the above-described test. The results are graphically illustrated in FIG. 1.

FIG. 1 illustrates graphs in which the amount ratio of {Si} and {Al} [c/(c+d)] is plotted as the abscissa and the logarithmic value of [amount of afterglow/amount of stimulated emission] as the ordinate with respect to $(Ba_{0.995},Ca_{0.005})FBr \cdot 0.0023NaBr \cdot c\{Si\} \cdot d\{Al\}: 0.001Eu^{2+}$ phosphor. Curves 1 to 3 correspond to the following cases of the total amount (c+d).

Curve 1: $c+d=0.006$
Curve 2: $c+d=0.0017$
Curve 3: $c+d=0.033$

As is clear from FIG. 1, the radiation image storage panels according to the invention which comprise the divalent europium activated barium fluorobromide phosphors containing both {Si} and {Al} showed smaller amounts of afterglow than the cases that the phosphor contained only one of {Si} and {Al} [c/(c+d)=1.0]. Particularly, the amount of afterglow was remarkably reduced when the amount ratio was in the range of $0.3 \leq c/(c+d) < 1.0$.

EXAMPLE 3

The procedure of Example 1 was repeated except for adding 0.085 g. of calcium fluoride, 0.215 g. of calcium bromide, 0.1 g. of sodium bromide, 0.059 g. of silicon dioxide and 0.096 g. of aluminum fluoride (AlF$_3$) to 100 g. of the pulverized product, to obtain a powdery divalent europium activated barium fluorobromide phosphor [$(Ba_{0.995},Ca_{0.005})FBr \cdot 0.0023NaBr \cdot 0.0023\{Si\} \cdot 0.0027\{Al\}:0.001Eu^{2+}$].

Using the obtained phosphor, a radiation image storage panel consisting essentially of a support, a phosphor layer and a transparent protective film was prepared in the same manner as described in Example 1.

COMPARISON EXAMPLE 3

The procedure of Example 1 was repeated except for adding 0.085 g. of calcium fluoride, 0.215 g. of calcium bromide, 0.1g. of sodium bromide and 0.18 g. of aluminium fluoride to 100 g. of the pulverized product, to obtain a powdery divalent europium activated barium fluorobromide phosphor [$(Ba_{0.995},Ca_{0.005})FBr \cdot 0.0023NaBr \cdot 0.005\{Al\}:0.001Eu^{2+}$].

Using the obtained phosphor, a radiation image storage panel consisting essentially of a support, a phosphor layer and a transparent protective film was prepared in the same manner as described in Example 1.

COMPARISON EXAMPLE 4

The procedure of Example 1 was repeated except for adding 0.085 g. of calcium fluoride, 0.215 g. of calcium bromide, 0.1 g. of sodium bromide and 0.13 g. of silicon dioxide to 100 g. of the pulverized product, to obtain a powdery divalent europium activated barium fluorobromide phosphor $[(Ba_{0.995}, Ca_{0.005})FBr\cdot 0.0023NaBr\cdot 0.005\{Si\}:0.001Eu^{2+}]$.

Using the obtained phosphor, a radiation image storage panel consisting essentially of a support, a phosphor layer and a transparent protective film was prepared in the same manner as described in Example 1.

The radiation image storage panels prepared in Example 3 and Comparison Examples 3 and 4 were evaluated on the afterglow characteristics by the above-described test. The results of the evaluation are set forth in Table 2. The ratio between the amount of {Si} (c value) and the amount of {Al} (d value) is also set forth in Table 2.

TABLE 2

|  | c/(c + d) | Relative Amount of Afterglow |
|---|---|---|
| Example 3 | 0.46 | −3.75 |
| Com. Example 3 | 0.0 | −3.43 |
| Com. Example 4 | 1.0 | −3.34 |

EXAMPLE 4

The procedure of Example 3 was repeated except for varying the amounts of silicon dioxide and aluminium fluoride to obtain a variety of divalent europium activated barium fluorobromide phosphors in which the total amount of {Si} and {Al} is constant and their amount ratio is in the range of $0-1.0[(Ba_{0.995},Ca_{0.005})FBr\cdot 0.0023NaBr\cdot c\{Si\}\cdot d\{Al\}:0.001Eu^{2+}, c+d=0.005]$.

Using thus obtained phosphors, a variety of radiation image storage panels consisting essentially of a support, a phosphor layer and a transparent protective film were prepared in the same manner as described in Example 1.

The radiation image storage panels prepared in Example 4 were evaluated on the afterglow characteristics by the above-described test. The results are graphically illustrated in FIG. 2.

Figure 2:
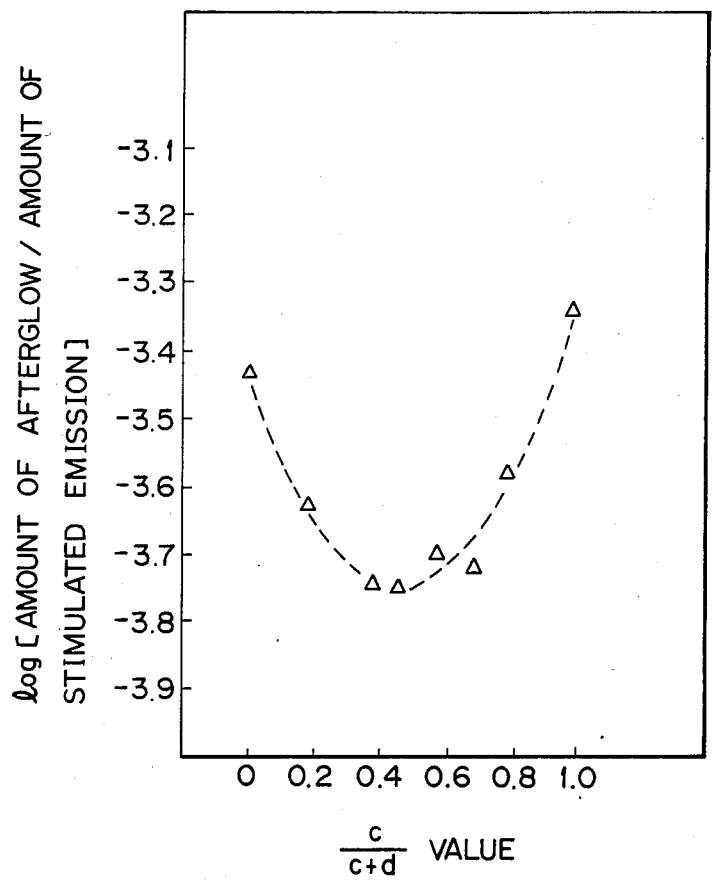
FIG. 2 graphically shows a relationship between c/(c+d) value and an amount of afterglow with respect to a radiation image storage panel containing $(Ba_{0.995},Ca_{0.005})FBr \cdot 0.0023NaBr \cdot c\{Si\} \cdot d\{Al\}:0.001Eu^{2+}$ phosphor which was prepared by using $SiO_2$ $AlF_3$ for starting materials of {Si} and {Al}, wherein $c+d=0.005$.

FIG. 2 illustrates a graph in which the amount ratio of {Si} and {Al} [c/(c+d)] is plotted as the abscissa and the logarithmic value of [amount of afterglow/amount of stimulated emission] as the ordinate with respect to $(Ba_{0.995},Ca_{0.005})FBr\cdot 0.0023NaBr\cdot c\{Si\}\cdot d\{Al\}: 0.001Eu^{2+}$ phosphor. The total amount of {Si} and {Al} is constant $(c+d=0.005)$.

As is clear from FIG. 2, the radiation image storage panels according to the invention which comprise the divalent europium activated barium fluorobromide phosphors containing both {Si} and {Al} showed smaller amounts of afterglow than the cases that the phosphor contained only one of {Si} and {Al} [c/(c+d)<0 or 1.0]. Particularly, the amount of afterglow was remarkably reduced when the amount ratio was in the range of $0.1 \leq c/(c+d) \leq 0.8$.

EXAMPLE 5

The prodedure of Example 1 was repeated except for adding 0.1 g. of sodium bromide, 0.1 g. of silicon dioxide and 0.04 g. of aluminium oxide to 100 g. of the pulverized product, to obtain a powdery divalent europium activated barium fluorobromide phosphor $[BaFBr\cdot 0.0023NaBr\cdot 0.004\{Si\}\cdot 0.002\{Al\}:0.001Eu^{2+}]$.

Using the obtained phosphor, a radiation image storage panel consisting essentially of a support, a phosphor layer and a transparent protective film was prepared in the same manner as described in Example 1.

COMPARISON EXAMPLE 5

The procedure of Example 1 was repeated except for adding 0.1 g. of sodium bromide and 0.12 g. of aluminium oxide to 100 g. of the pulverized product, to obtain a powdery divalent europium activated barium fluorobromide phosphor $[BaFBr\cdot 0.0023NaBr\cdot 0.006\{Al\}:0.001Eu^{2+}]$.

Using the obtained phosphor, a radiation image storage panel consisting essentially of a support, a phosphor layer and a transparent protective film was prepared in the same manner as described in Example 1.

COMPARISON EXAMPLE 6

The procedure of Example 1 was repeated except for adding 0.1 g. of sodium bromide and 0.15 g. of silicon dioxide to 100 g. of the pulverized product, to obtain a powdery divalent europium activated barium fluorobromide phosphor $[BaFBr\cdot 0.0023NaBr\cdot 0.006\{Si\}:0.001Eu^{2+}]$.

Using the obtained phosphor, a radiation image storage panel consisting essentially of a support, a phosphor layer and a transparent protective film was prepared in the same manner as described in Example 1.

The radiation image storage panels prepared in Example 5 and Comparison Examples 5 and 6 were evaluated on the afterglow characteristics by the above-described test. The results of the evaluation are set forth in Table 3. The ratio between the amount of {Si} (c value) and the amount of {Al} (d value) is also set forth in Table 3.

TABLE 3

|  | c/(c + d) | Relative Amount of Afterglow |
|---|---|---|
| Example 5 | 0.66 | −3.50 |
| Com. Example 5 | 0.0 | −3.27 |
| Com. Example 6 | 1.0 | −3.30 |

We claim:

1. A divalent europium activated barium fluorohalide phosphor having the formula (I):

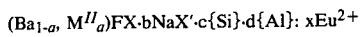

in which $M^{II}$ is at least one alkaline earth metal selected from the group consisting of Ca and Sr; each of X and X' is at least one halogen selected from the group consisting of Cl, Br and I; {Si} and {Al} are respectively Si component and Al component; a, b, and x are numbers satisfying the conditions of $0 \leq a \leq 5 \times 10^{-2}$, $0 < b \leq 2.0$ and $0 < x \leq 0.2$, respectively; and c and d are numbers satisfying the conditions of $10^{-5} \leq c+d \leq 0.5$ and $0 < c/(c+d) < 1.0$, wherein said phosphor shows less afterglow in a period of $10^{-3}$ to $10^{-2}$ seconds after excitation with an electromagnetic wave within a wavelength region of 450–900 nm after exposure to a radiation than the corresponding afterglow emitted by a phosphor having the formula:

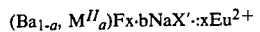

in which $M^{II}$, X, X', a, b and x have the same meanings as above.

2. The phosphor as claimed in claim 1, in which c and d in the formula (I) are numbers satisfying the condition of $5\times10^{-5}\leq c+d \leq 0.3$.

3. The phosphor as claimed in claim 2, in which c and d in the formula (I) are numbers satisfying the condition of $10^{-4}\leq c+d \leq 0.2$.

4. The phosphor as claimed in any one of claims 1 to 3, in which said phosphor is a product obtained by using $SiO_2$ and $Al_2O_3$ as starting materials of {Si} and {Al} in the formula (I); and c and d are numbers satisfying the condition of $0.3\leq c/(c+d)<1.0$.

5. The phosphor as claimed in any one of claims 1 to 3, in which said phosphor is a product obtained by using $SiO_2$ and $AlF_3$ as starting materials of {Si} and {Al} in the formula (I); and c and d are numbers satisfying the condition of $0.1\leq c/(c+d)\leq 0.8$.

6. The phosphor as claimed in claim 1, in which a in the formula (I) is a number satisfying the condition of $0<a\leq 5\times 10^{-2}$.

7. The phosphor as claimed in claim 6, in which a in the formula (I) is a number satisfying the condition of $5\times 10^{-4}\leq a\leq 2\times 10^{-2}$.

8. The phosphor as claimed in claim 1, in which b in the formula (I) is a number satisfying the condition of $10^{-5}\leq b\leq 5\times 10^{-1}$.

9. The phosphor as claimed in claim 1, in which X in the formula (I) is at least one halogen selected from the group consisting of Br and I.

10. The phosphor as claimed in claim 1, in which X' in the formula (I) is Br.

11. A radiation image storage panel comprising a support and a stimulable phosphor layer provided thereon, characterized in that said stimulable phosphor layer contains a divalent europium activated barium fluorohalide phosphor having the formula (I):

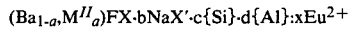

in which $M^{II}$ is at least one alkaline earth metal selected from the group consisting of Ca and Sr; each of X and X' is at least one halogen selected from the group consisting of Cl, Br and I; {Si} and {Al} are respectively Si component and Al component; a, b and x are numbers satisfying the conditions of $0\leq a\leq 5\times 10^{-2}$, $0<b\leq 2.0$ and $0<x\leq 0.2$, respectively; and c and d are numbers satisfying the conditions of $10^{-5}\leq c+d\leq 0.5$ and $0<c/(c+d)<1.0.$, wherein said phosphor shows less afterglow in a periof of $10^{-3}$ to $10^{-2}$ seconds after excitation with an electromagnetic wave within a wavelength region of 450-900 nm after exposure to a radiation than the corresponding afterglow emitted by a phosphor having the formula:

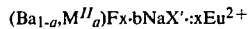

in which $M^{II}$, X, X', a, b and x have the same meanings as above.

12. The radiation image storage panel as claimed in claim 11, in which c and d in the formula (I) are numbers satisfying the condition of $5\times 10^{-5}\leq c+d\leq 0.3$.

13. The radiation image storage panel as claimed in claim 12, in which c and d in the formula (I) are numbers satisfying the condition of $10^{-4}\leq c+d\leq 0.2$.

14. The radiation image storage panel as claimed in any one of claims 11 to 13, in which said phosphor is a product obtained by using $SiO_2$ and $Al_2O_3$ as starting materials of {Si} and {Al} in the formula (I); and c and d are numbers satisfying the condition of $0.3\leq c/(c+d)<1.0$.

15. The radiation image storage panel as claimed in any one of claims 11 to 13, in which said phosphor is a product obtained by using $SiO_2$ and $AlF_3$ as starting materials of {Si} and {Al} in the formula (I); and c and d are numbers satisfying the condition of $0.1\leq c/(c+d)\leq 0.8$.

16. The radiation image storage panel as claimed in claim 11, in which a in the formula (I) is a number satisfying the condition of $0<a\leq 5\times 10^{-2}$.

17. The radiation image storage panel as claimed in claim 16, in which a in the formula (I) is a number satisfying the condition of $5\times 10^{-4}\leq a\leq 2\times 10^{-2}$.

18. The radiation image storage panel as claimed in claim 11, in which b in the formula (I) is a number satisfying the condition of $10^{-5}\leq b\leq 5\times 10^{-1}$.

19. The radiation image storage panel as claimed in claim 11, in which X in the formula (I) is at least one halogen selected from the group consisting of Br and I.

20. The radiation image storage panel as claimed in claim 11, in which X' in the formula (I) is Br.

* * * * *